(12) United States Patent
Popovski et al.

(10) Patent No.: US 9,456,467 B2
(45) Date of Patent: Sep. 27, 2016

(54) RATE-LESS WIRELESS COMMUNICATION USING PROTOCOL CODING

(75) Inventors: Petar Popovski, Aalborg SV (DK); Niels-Christian Gjerrild, Aalborg (DK)

(73) Assignee: Reseiwe A/S, Aalborg Øst (DK)

( * ) Notice: Subject to any disclaimer, the term of this patent is extended or adjusted under 35 U.S.C. 154(b) by 283 days.

(21) Appl. No.: 14/240,814

(22) PCT Filed: Aug. 30, 2012

(86) PCT No.: PCT/DK2012/050322
§ 371 (c)(1), (2), (4) Date: Feb. 25, 2014

(87) PCT Pub. No.: WO2013/029628
PCT Pub. Date: Mar. 7, 2013

(65) Prior Publication Data
US 2014/0185579 A1    Jul. 3, 2014

(30) Foreign Application Priority Data
Aug. 30, 2011    (EP) ..................................... 11179305

(51) Int. Cl.
| | | |
|---|---|---|
| *H04W 80/00* | (2009.01) | |
| *H04W 28/22* | (2009.01) | |
| *H04L 29/06* | (2006.01) | |
| *H04L 5/00* | (2006.01) | |
| *H04L 1/00* | (2006.01) | |

(52) U.S. Cl.
CPC ............ *H04W 80/00* (2013.01); *H04L 1/0006* (2013.01); *H04L 5/0053* (2013.01); *H04L 29/06176* (2013.01); *H04L 65/1016* (2013.01); *H04W 28/22* (2013.01); *H04L 1/0002* (2013.01)

(58) Field of Classification Search
None
See application file for complete search history.

(56) References Cited

U.S. PATENT DOCUMENTS

| | | |
|---|---|---|
| 7,009,952 B1 | 3/2006 | Razavilar et al. |
| 2005/0163047 A1 | 7/2005 | McGregor et al. |
| 2009/0210757 A1 | 8/2009 | Yue et al. |
| 2011/0096760 A1* | 4/2011 | Lee ..................... H04W 52/242 370/338 |

FOREIGN PATENT DOCUMENTS

WO    2011/063813 A1    6/2011

OTHER PUBLICATIONS

Petar Popovski et al.; Protocol Coding for Reliable Wireless Bits Under Jamming: Concept and Experimental Validation; Department of Electronic Systems, Aalborg University, Denmark; Dated 2011; (6 pages).
International Search Report corresponding to co-pending International Patent Application Serial No. PCT/DK2012/050322, European Patent Office, dated Jan. 16, 2013; (5 pages).

(Continued)

*Primary Examiner* — Ashley Shivers
(74) *Attorney, Agent, or Firm* — Nixon Peabody LLP

(57) ABSTRACT

A communication system having two communication units configured for wireless communication and a method for wireless communication. Each of the communication units includes a communication controller using at least two communication protocols: a first protocol for communicating having a first error rate threshold and a fixed data rate, and a second protocol for communicating having a second error rate threshold being higher than the first error rate threshold and a non-fixed data rate. The communication controller switches between the first protocol and the second protocol.

12 Claims, 5 Drawing Sheets

(56) References Cited

OTHER PUBLICATIONS

International Written Opinion corresponding to co-pending International Patent Application Serial No. PCT/DK2012/050322, European Patent Office, dated Jan. 16, 2013; (12 pages).

Extended European Search Report corresponding to co-pending European Patent Application Serial No. 11179305.5, European Patent Office, dated Feb. 16, 2012; (13 pages).

Popovski, P et al: "On the Secondary Capacity of the Communication Prototols"; Dated 2009; (8 pages).

Popovski, P et al: "Protocol Coding through Reordering of User Resources: Applications and Capacity Results"; Dated Nov. 26, 2010; (34 pages).

Popovski, P: "Reliable Wireless Bits to a Jammed Receiver through Protocol Coding—Concept and Experimental Validation"; Dated Nov. 2, 2011; (1 page).

* cited by examiner

RATE-LESS WIRELESS COMMUNICATION USING PROTOCOL CODING

CROSS-REFERENCE TO RELATED APPLICATIONS

This application is a U.S. National Stage of International Application No. PCT/DK2012/050322, filed Aug. 30, 2012, which claims the benefit of European Patent Application No. 11179305.5, filed Aug. 30, 2011, both of which are incorporated herein by reference in their entireties.

FIELD OF THE INVENTION

The present invention relates to wireless communication systems. Especially wireless communication systems having the capability to switch to an alternative communication protocol if the normal communication protocol breaks down, e.g. due to weak reception, noise or jamming.

BACKGROUND OF THE INVENTION

When wireless units communicate the usual way for the protocols to react to degradation of data transfer rate is to attempt to lower the transfer rate until a certain level where the communication is stopped. When the communication is stopped the units are not able to communicate. Usually the data transfer rate is abruptly brought to zero. If no communication is present the users of the units will not be able to receive messages, e.g. receive warnings.

Hence, an improved communication system and method would be advantageous, and in particular a more efficient and/or reliable communication system for use in situations where error rates rises to hinder communication would be advantageous.

OBJECT OF THE INVENTION

Wireless communication systems and methods are described in publications such as US 2009/0210757 and US 2005/0163047.

It is at least an object of the present invention to provide an alternative to the prior art.

In particular, it may be seen as an object of the present invention to provide a communication system and method that solves the above mentioned problems of the prior art with lack of communication when error rates or probability of error rises.

SUMMARY OF THE INVENTION

The invention is particularly, but not exclusively, advantageous for obtaining a system enabling reliable wireless communication in most situations, e.g. even when the system is subjected to jamming or other disturbing signals or weak received signals.

Thus, the above described object and several other objects are intended to be obtained in a first aspect of the invention by providing a communication system comprising two communication units configured for wireless communication. The system may include more than two communication units. Advantageously each of the two communication units may comprise a communication controller configured to control communication to a wireless communication network, the communication controller including two communication protocols, a first protocol for communicating having a first error rate threshold and a fixed data rate, and a second protocol for communicating having a second error rate threshold being higher than the first error rate threshold and a non-fixed data rate, the communication controller being configured to switch from the first protocol for communicating to the second protocol for communicating, wherein the first communication protocol includes transmitting a signalling unit and a corresponding data unit, the second communication protocol treating the signaling units and the data units of the first communication protocol as secondary modulation symbols and the data unit and the signaling unit for the second communication protocol are sent through the secondary modulation symbols. Presently it is contemplated to measure the error rate and compare that to an error rate threshold. Other measures such as data rate may be employed, e.g. detecting if/when the data rate drops below a certain data rate threshold in a similar manner as with the error rate.

Most common communication protocols reduce the data rate quite dramatically to zero, thereby ending communication. Therefore there is a need for a protocol where communication is maintained even though data rates are reduced.

The system according to the first aspect of the present invention is not only applicable to the case of two communication units, but also to the general case in which the communication protocol is used for communication among multiple units. In the system having multiple communications units, or nodes, potentially any node can send information to any of the other nodes. Then, some or all of the nodes in the network can be reconfigured to communicate by using the second communication protocol.

The system according to the first aspect of the present invention is not only applicable to the case of two communication units, but also to the general case when one communication unit is transmitting the same information to multiple communication units, i.e. broadcasting. In the system having multiple communications units, or nodes, potentially any node can send information to any of the other nodes. Then, some or all of the nodes in the network can be reconfigured to communicate by using the second communication protocol.

The invention could be useful in a range of scenarios. One such scenario includes a number of devices being connected to access points that are, in some architecture, interconnected in a network infrastructure. Under normal conditions, each device is connected to the network infrastructure by using the first communication protocol. If a device becomes disconnected from the network infrastructure, e. g. due to the failure of the access point to which it is connected or due to weakened signal, then the network can switch to operate with the second communication protocol, which thus constitutes a robust mode, in order to re-establish the link with that device.

The mentioned fixed data rate may be a fixed data rate threshold as there are communication protocols that as mentioned attempt to lower the data rate to be able to establish a reliable communication channel.

Advantageously the first communication protocol may include transmitting metadata using signaling units and data using data units, the second communication protocol comprising transmitting data using the signalling unit of the first protocol. When the system reconfigures the data to be transmitted, the signalling unit of the first protocol, i.e. the part of the transmission also called the header or pointer to the data, may be used for transmitting the data. In the present invention the data units and the signaling units of the first communication protocol are generally regarded as modulation signals used by the second communication protocol. Treating them as modulation symbols, the second communication protocol can define new signaling and data units as well as redefined the structure of the protocol. For example, the first communication protocol may use a signaling unit called beacon. On the other hand, the beacon of the second communication protocol can comprise several beacons, other signaling units, and data units of the first signaling protocol.

Advantageously the second communication protocol may further comprise transmitting data using the data unit of the first protocol. Advantageously the data to be transmitted may be distributed to the data parts of the first protocol. This is described in more detail elsewhere.

Advantageously the data blocks of the first communication protocol is used as signalling units in the second communication protocol. By using the data blocks encoding efforts could be reduced.

Advantageously the second protocol lowers data rates gradually towards zero for re-establishing a communications channel. The data rate may be lowered according to a predetermined pattern depending on e.g. signal strength or error rate. Advantageously the first protocol includes reducing transmission rate due to increasing error rate until a predetermined transmission rate limit.

A second aspect of the present invention relates to a method for communicating using a communication system comprising two communication units configured for wireless communication, each of the two communication units comprising a communication controller configured to control communication to a wireless communication network, the communication controller including two communication protocols, a first protocol for communicating having a first error rate threshold and a fixed data rate, and a second protocol for communicating having a second error rate threshold being higher than the first error rate threshold and a non-fixed data rate, the communication controller being configured to switch from the first protocol for communicating to the second protocol for communicating, wherein the first communication protocol includes transmitting a signalling unit and a corresponding data unit, the second communication protocol treating the signaling units and the data units of the first communication protocol as secondary modulation symbols and the data unit and the signaling unit for the second communication protocol are sent through the secondary modulation symbols, the method comprising determining first error rate when using the first protocol, determining if first error rate is above a first predetermined threshold, and provided the first error rate is above the first predetermined threshold, switching the communication from the first communication protocol to the second communication protocol.

The method may be performed using multiple units, e.g. one station or unit broadcasting to a number of recipients, or two units of a set of unit establishing communication which is then disturbed. The method may also be performed by several units each having to receive data, such that one unit sends to a subset of units, i.e. not necessarily to all the other units.

Advantageously the first protocol includes transmitting metadata using signaling units and data using data units, the second communication protocol comprising transmitting data using the signalling unit of the first protocol, the method comprising arranging data to be transmitted using the second protocol in the signalling units of the first protocol.

Advantageously the second communication protocol further comprising transmitting data using the data unit of the first protocol, the method comprising arranging data to be transmitted using the second protocol in the data units of the first protocol.

Advantageously the data blocks of the first communication protocol is used as signalling units in the second communication protocol.

Advantageously the second protocol lowers data rates gradually towards zero for re-establishing a communications channel.

Advantageously the protocols includes satellite communications, cellular mobile communications with GSM, 3G, LTE, WiMax, wireless local area networks (WiFi), wireless sensor networks, TETRA, Bluetooth, DECT and proprietary protocols for emergency and military systems or the like.

The method according to the second aspect may advantageously be performed using a communication system according to the first aspect. Features and advantages of the different aspects may be combined and interchanged.

BRIEF DESCRIPTION OF THE FIGURES

The system and method according to the present invention will now be described in more detail with regard to the accompanying figures. The figures show one way of implementing the present invention and is not to be construed as being limiting to other possible embodiments falling within the scope of the attached claim set.

DETAILED DESCRIPTION OF AN EMBODIMENT

Figure 1:
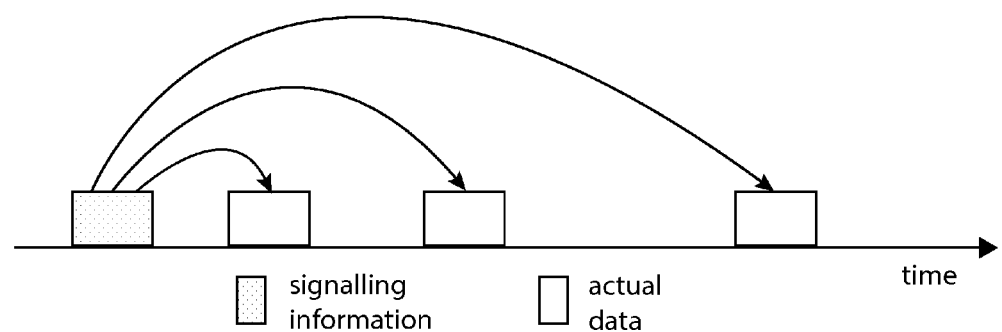
FIG. 1 is a schematic illustration of a circuit-switched connection, where signalling information is physically separated from the data. The pointers emerging from the signalling information are indicating when B should expect data from A.
Figure 2:
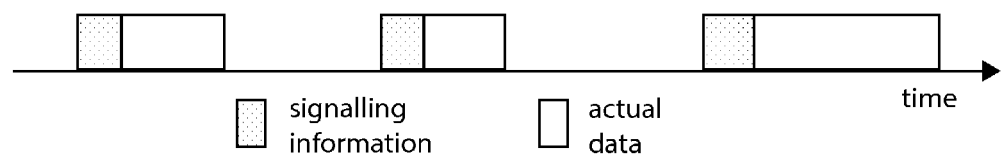
FIG. 2 is a schematic illustration of a packet-switched connection, where signalling information is physically associated with the data.

In a digital communication system, if node A sends data to node B, then the useful data from node A can correctly be interpreted by B only if B receives an appropriate signalling information. Such signalling information can be sent in two generically different ways, such that the connection between A and B can be either circuit-switched or packet-switched. In a circuit switched connection, B receives signalling information from A which establishes a communication channel between A and B over an extended period. FIG. 1 depicts the relation between the signalling information and the actual data in a circuit-switched connection, where signalling is physically separated from the data. FIG. 2 depicts the operation of a system with packet-switched data, where signalling is associated with each chunk of data.

Regardless of which type of operation is employed and how often signalling information is sent, digital communication is commonly done by robust encoding of the signalling information in order to establish the data channel. We will use the term header to refer to any signalling information. Only after the channel is established and both the transmitter and the receiver are aware that a transmission will take place, one can apply the usual information-theoretic models and efficient coding techniques over such an established channel.

Figure 3:
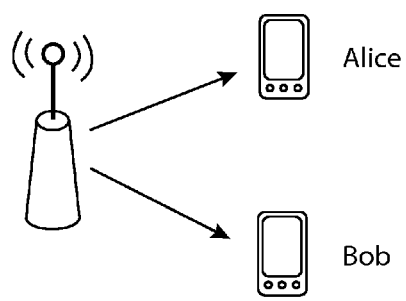
FIG. 3 is a schematic illustration of a simple wireless communication system where a Base Station sends information to two terminals, Alice and Bob.

In wireless networks, where the communication medium may be shared among multiple nodes, the reception of the header is critical, not only to correctly interpret the data, but also to save power at the mobile wireless receivers. FIG. 3 illustrates a simple wireless communication system in which a Base Station sends information to two terminals. Each data packet is preceded by a header that indicates which terminal is the intended destination of the data that follows. If Alice receives a header that indicates that the following data is intended for Bob, then Alice can turn off its receiver in order to save battery power and spare the effort to receive irrelevant data. On the other hand, under typical operating conditions, Bob will receive the header almost with probability 1, and then try to decode the subsequent data. If the data is not decoded correctly, then Bob is at least aware that the data was intended to him and can request retransmission.

In general, the described model of header/data separation works well under typical transmission conditions, loosely defined as conditions with relatively low error probability for the data part and practically zero error probability for the header part. Nevertheless, if the transmission conditions worsen, e. g. caused by a jammer, towards very high error probability in the data part and not-close-to-zero error probability for the header part, then the communication protocol can practically break down. The reason is that the communication protocols are inherently limited in order to avoid "infinite loops": for example, if L consecutive transmissions are not successful, then the transmitter deems the connection inexistent. Such an operation would be indeed useful if, for example, on FIG. 3, Alice moves out of the coverage of the Base Station to another Base Station.

Nevertheless, today there is an abundance of widespread wireless systems (such as cellular, satellite, Wi-Fi, WiMax, LTE, Bluetooth, ZigBee, Z-Wave, TETRA, proprietary systems, etc.) and these systems are increasingly used in applications that were not originally envisioned. This implies that the standard operation has been defined for "typical" conditions that are not correspondent to the application at hand. For example, the ubiquitous usage of WiFi makes it appealing to apply it for monitoring/control in homes/industries. However, those scenarios put different requirements on the reliability and the data rates compared to the ones that were accounted for when the system has been standardized. In this particular example, it would be desirable to use standard WiFi cards/chips, but modify their protocol stack in order to achieve the target reliability.

One objective of the present invention is to provide technologies that enable reconfiguration of an existing, standardized wireless communication system, so that this system is capable of operating under conditions in which transmission errors would either make the original system inefficient or even non-functional. The target technologies proposed here aim to operate with standardized chips, as they do not require any change to the physical layer. The reconfiguration is exhibited at the MAC/link layer.

Another objective of the invention is to present techniques on how to convert any wireless communication system into a rateless wireless system. The term rateless is inspired from rateless codes for error control, where the communication rate is not determined in advance. Namely, the transmitter Alice continuously produces new coded bits/packets from the same message and sends them until the receiver Bob returns a feedback signal indicating that he has received the message. Since some of the transmitted bits/packets can be either lost in the transmission or can be received incorrectly, the total time that is required to send the message from Alice to Bob is random and it depends on the amount of errors/losses introduced by the communication channel. Thus the overall data rate adapts to the current state of the channel, e. g. if the channel is bad, then the average time needed to send the message increases, such that the overall rate becomes lower.

However, with the usual way in which the wireless communication systems are designed, it is not possible for the systems to operate in a way that the overall data rate degrades as the channel worsens, reaching extremely low data rates (such as few kilobits per second or even few bytes over few seconds). This is because in a digital communication system the transmission at the physical layer is usually organized in frames, with each frame containing frame header and a data container. The condition to receive the bits from the data part is to receive the frame header. Consider the example on FIG. 5. The frames with frame headers H3 and H4 in their data parts both contain the data marked "D2". This means that in the data part both frames carry bits that are related to the same message. For example, the message might be encoded via error control coding part of the error-encoded bits can be put in the frame with H3, while the other part can be put in the frame with H4. Ideally, even if the part D2 of both frames may contain error, both parts can be gathered at the receiver and put through an error-correction decoder and thus decode the message correctly with higher probability compared to the case when only one of the D2 parts is considered by the receiver. However, if the header H3 is not received correctly, then the data part D2 of the frame with H3 is not used. Hence, in the usual wireless systems the pre-condition is to decode the frame header correctly, but, on the other hand, the receiver is given only one chance to decode the header correctly. This is opposite to the principle of rateless coding, where the transmitter continuously increases the chances that the message is received correctly.

For example, let us assume that in normal operating conditions (i.e. low probability of error) it is required that, on average, Bob receives S1 data packets before he is able to successfully decode the message. Under the normal operating conditions, the probability of error for the frame header is practically 0, such that in order to receive S1 data packets, Bob needs to receive S1 frames. When the channel worsens and introduces excessive errors, then, due to the type of coding used, Bob needs, on average, S2>S1 data packets. However, now the probability of error for the frame headers also increases, such that in order to receive S2 data packets, Bob needs to receive, on average, S3>S2 frames. This is because in (S3-S2) frames the frame header is not received, such that the data part of the frame is useless.

When the errors are excessive, then it is required that S3>>S2. However, in such cases other mechanisms of the communication protocol start to play a role, such that the wireless link may completely stop to operate. For example, in order to avoid endless deadlock, the system may be designed so that Bob deems the link to Alice inexistent if he does not receive any header correctly within a time T or if he receives L consecutive frame headers from Alice incorrectly. Such a design is useful to deal with a situation in wireless mobile systems in which Bob and Alice move out of each other's range. However, if for certain reason we know that Bob and Alice are static (e. g. pre-installed devices) or there is a critical message that must be sent from Alice to Bob by any means possible, then such a design prohibits the system from gracefully degrading the communication rate towards ultra-low, but reliable data rate.

Figure 4:
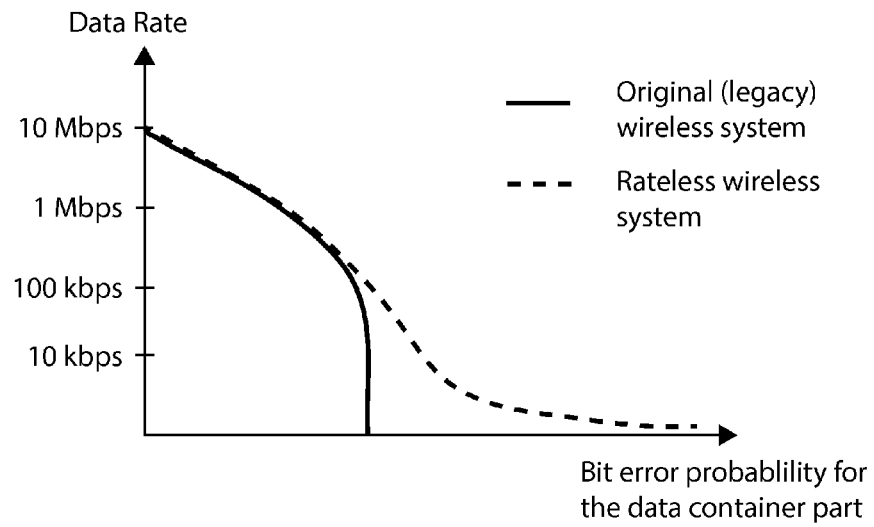
FIG. 4 is a schematic illustration of a comparison of the decrease of the data rate in a usual wireless system (termed legacy wireless) and the rateless wireless operation.

FIG. 4 illustrates how the data rate changes in a usual (legacy) wireless communication system as the probability of error increases (due to weak signal, jamming, etc.). This curve is compared to the curve that illustrates how a rateless wireless system is envisioned to operate. The main idea of this invention is to propose principles, methods and techniques that can reconfigure any legacy wireless communication system in a rateless wireless system by not requiring changes of the core PHY-layer or RF techniques already implemented in the legacy wireless system.

At this point it is instructive to introduce some terminology that will be used later on. We will refer to a 'legacy' (primary) communication system the communication system that is already implemented or standardized and is in use. We will use the term 'frame' to refer to a PHY-layer unit transmitted in the legacy communication system. This frame comprises frame header and a data container. Sometimes we will refer to it only as header and data, respectively. In this specification the message represents the information that needs to be sent reliably through the modified operation of the legacy communication system.

The present specification presents ideas illustrated by a simple communication system. Let us assume that Alice sends data to Bob through a legacy communication system that utilizes frames with header and data, similar to the packet-switched connection depicted on FIG. 2. The original, legacy communication system is designed as follows:

The data part of a frame is only interpreted if the header is correctly received. If the header is not correctly received, the data part is completely dropped.

The header is robustly encoded in order to ensure low error probability. Typically, in systems the concept of Unequal Error Protection (UEP) is utilized, where header/control information has a better error protection compared to the data part.

The PHY-layer parameters of the transmission are fixed due to standardization and/or the way the radio chips are built. That is, our constraint is that we do not want to incur any changes that would require new chip design.

Figure 5:
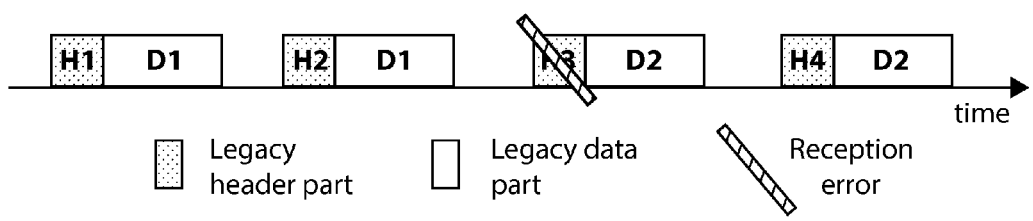
FIG. 5 is a schematic illustration of combining of two packets in order to increase the data reliability in the legacy system.

Any other relevant features of the legacy communication system will be outlined as the description of the ideas proceeds. The key thing to notice is, as the system is originally designed, the legacy data part is useless if the header is not received correctly. One of our objectives is to open the possibility to use the data part of a certain transmission despite the fact that the corresponding header has not been received correctly. In order to do this, let us recall the principle increasing the reliability of reception via combining of different packet receptions. This is illustrated in FIG. 5. The frames with headers H1 and H2 contain the same data packet D1. Note that we leave the possibility that the headers H1 and H2 are different, although they are indicating identical data within the data packet part. For example, H1 may indicate that this is the original transmission of D1, while H2 can indicate the retransmission of D1. The packet combing (e. g. Chase combining) at the physical layer works as follows: if both H1 and H2 are received correctly, then the two different received instances of D1 are combined before a decision on the received bits of D1 is made. Note that, for the example on FIG. 5, such a combining is impossible for the data packet D2, as the header H3 is not received correctly. One may argue that this is a statistically rare event, as the header is more robustly encoded than the data, such that if the header H3 is incorrect, then likely the data D2 contains a lot of errors. Still, note that such an erroneous D2 can be still beneficial for improving the overall reliability when combined with D2 with the header H4.

One of the proposals of this invention is to design transmission methods that do not require a frame header to be received correctly in order to use the data part from the data container in the same frame. There are different ways in which the headers can be combined, and we will illustrate some of them.

Figure 6:
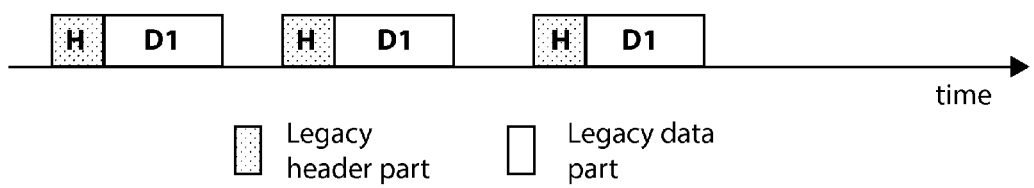
FIG. 6 is a schematic illustration of combining of headers through a simple repetition coding in order to improve data reliability.

One of the simplest ways to do this is described on FIG. 6. Each data portion is sent three times in three different frames with headers H1, H2, H3, but in this case H1=H2=H3. The receiver tries to decode the individual header and, regardless if the decoding is successful or not, the received header is kept in the memory. When the three data frames are received the following is done: The content of the header is decided jointly for all three frames: Each of the header bits is decided based on majority voting. If such a process produces a valid header value, then the data part from the three frames is combined in order to produce a reliable decision on the received data.

When the transmitter detects that the transmission conditions have worsened, on-the-fly redundancy to the header can be added. As one example, assume that there are some bits in the header that are unused (i. e. for future use). Referring again to FIG. 6, at the encoding side the three headers H1, H2, H3 can be combined and a certain error-correction code can be applied which can produce parity bits Pb=f(H1, H2, H3), i. e. these parity bits are dependent on the information in all three headers. These parity bits can be suitably distributed across the unused bits of all three headers (perhaps after an operation of puncturing in order to fit the bits to the free space available in the headers).

Figure 7:
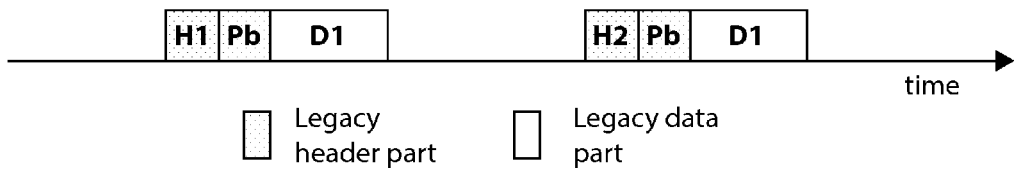
FIG. 7 is a schematic illustration of addition of an extra header entity at the physical layer in order to improve the reliability.

As another example, the system can be reconfigured on the fly in order to operate with a better header protection, regardless of the availability of bits for future use. Assuming that a full header is the minimal (atomic) transmission entity and one cannot send only a part of the header at the physical layer, then when the transmission condition worsen, the frames are sent with two headers, as shown on FIG. 7. The header data H1, H2 is used to calculate additional header parity bits:

$$(Pb1, Pb2) = f(H1, H2)$$

Note that both Pb1 and Pb2 depend on both H1 and H2. Again, the headers H1 and H2 may be decoded individually, but regardless of the decoding outcome, the sequence (H1, Pb1, H2, Pb2) is regarded as a single sequence encoded with an error-correction code and H1/H2 are decoded jointly after both frames are received.

For both examples on FIGS. 5 and 6, a natural question is—how does the legacy system know that it should not only interpret the headers individually, but it should collect the headers from several frames and decode them jointly. More specifically, in the case with the bits for future use, how does the receiver know that they contain parity information? Or for the other case, how does the receiver know that there are two instead of one header and both need to be received? These and related questions will be addressed in the sections that follow, but at first we provide the most general description of the proposal.

Figure 8:
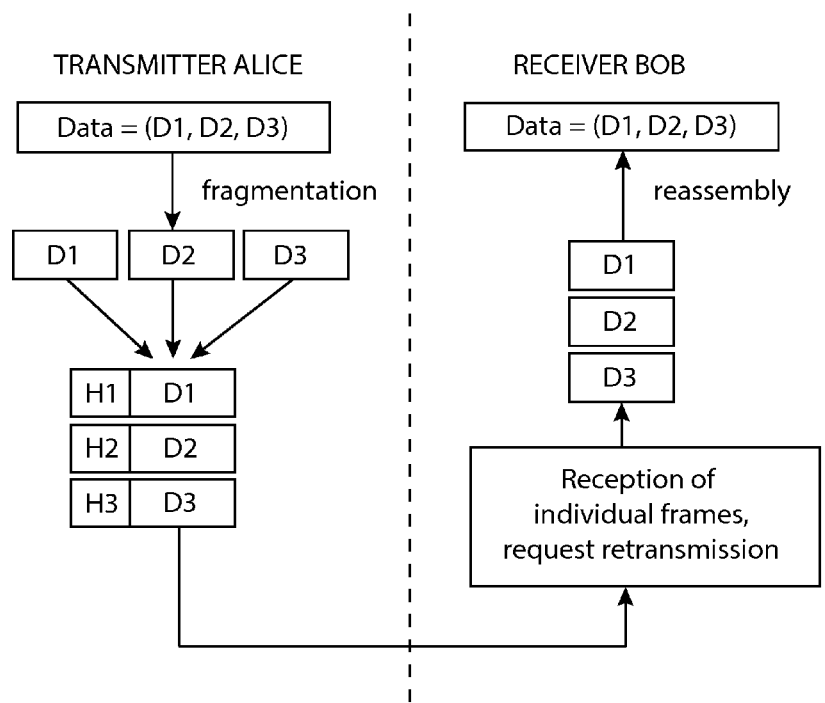
FIG. 8 is a schematic illustration of a simplified schematic description of a conventional system setup at the link/PHY layer.

FIG. 8 is a simplified scheme to illustrate a conventional way in which a system is operated. The physical-layer headers Hi added to the frames are usually more robustly encoded than the data portions Di of the frame. The first condition for a frame to be accepted at the receiver is that the header is received correctly. If the header is received correctly, but the data not, then the receiver requests retransmission. In any case, the conventional system setup relies on the assumption that the header and the data part at the physical layer are separated in a predefined way. Note that the original data is fragmented into D1, D2, D3 and the headers Hi do not depend on the data content of D1, D2, D3.

Figure 9:
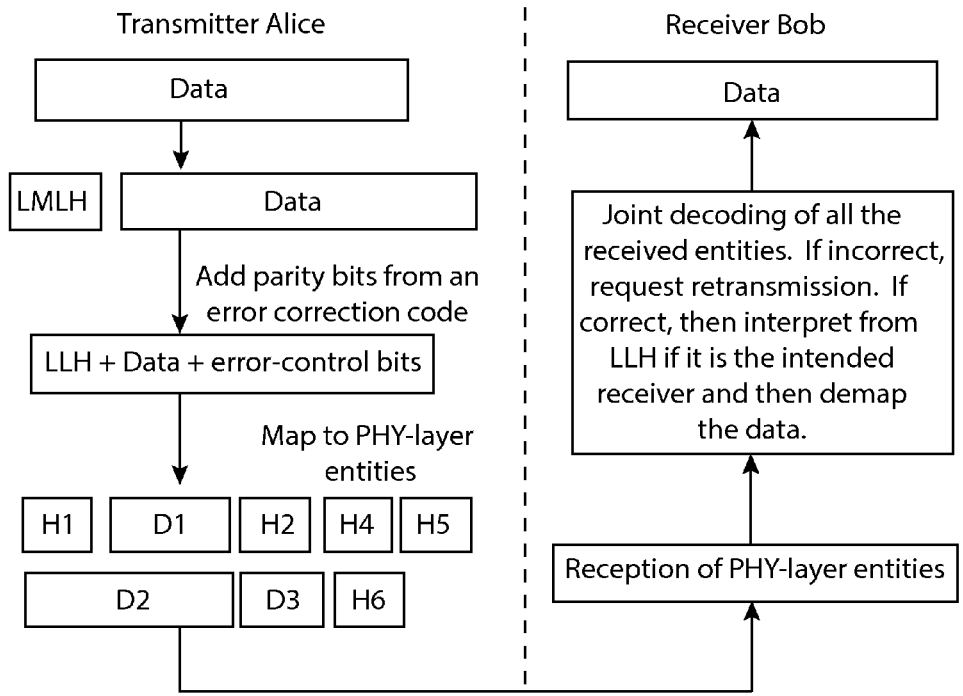
FIG. 9 is a schematic illustration of simplified schematic description of the proposed system operation with a generalize mapping to PHY-layer entities, LMLH stands for 'Link-MAC-Layer Header'.

FIG. 9 illustrates the general proposal of this invention. The frame headers Hi and the frame data containers Di are now observed as PHY-layer entities (PLE) and the data is mapped to them as if they were representing a certain modulation. First a link-MAC-layer header (LMLH) is added to the original data in order to make a composite packet. Instead of mapping LMLH to Hi, the PHY-layer header and Di, the data part to PHY-layer data entity, the composite packet is now mapped to the physical layer entities according to some optimization criterion. Before the mapping, additional error correction code can be added. Note that the entities Hi and Di do not need to have a fixed length. In general, the receiver Bob should assemble all physical layer entities and decode the error correction code in order to be able to interpret LLH and thus find out if the data received is intended for Bob or not.

The conventional schemes, such as illustrated on FIG. 8, can be regarded as a special case of the system on FIG. 9. Simply put, LMLH is only mapped to the PHY-layer entities (PLE) Hi, while the data is only mapped to the PLE Dj, while there is no addition error correction code applied over Data and LMLH jointly.

The error correction code used on FIG. 9 can be of any kind—convolutional, LDPC, turbo, block code, etc. It is important to notice that this error control code treats the PLEs as modulation entities, i. e. objects that can be modulated with the bits outputted from the error correction code.

In that way, for example, one can design an efficient combined coding/modulation procedure by using the principles of trellis coding, but instead of mapping the bits to constellations, they are mapped to PLEs.

Figure 10:
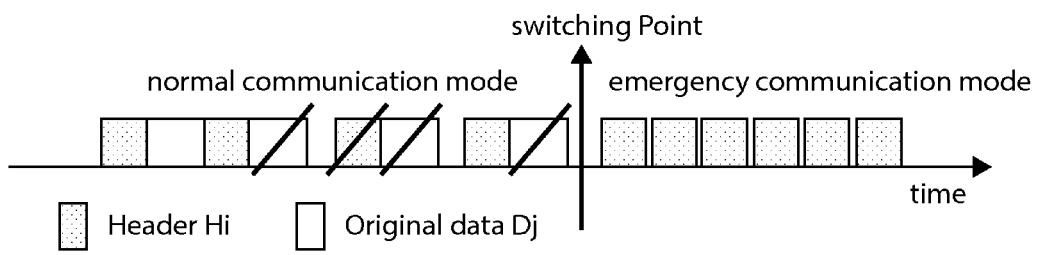
FIG. 10 is a schematic illustration of switching between a normal communication mode and emergency communication mode in a packet-based digital communication system.

An interesting case is depicted on FIG. 10. Alice is sending packets to Bob using the normal communication mode, where a header is followed by data. Upon excessive errors, Alice does the transmission exclusively by the headers, i. e. the Hi PLEs. Such excessive errors can occur, e. g. under very weak signal reception or excessive jamming or interference. The rationale is that Hi are the most robust PLEs, and they can be used to create a channel with low, ultra-reliable, data rate. Note that there is a switching point, such that prior to the switching point, the headers of the physical-layer frame are only interpreted as headers, i. e. pointers to the data that follows the header. After the switching point, the system operates in an emergency communication mode and it is considered that each PLE of type Hi carries useful data.

Let us assume that there are M bits that can be changed in the header. If these bits can be changed without any restrictions, then every PLE of type Hi carries M information bits. However, there can be cases where M bits can be changed in the header, but the changes are subject to certain restrictions under which the original system operates. For example, the header may contain an M-bit field that denotes an address of a node that belongs to the network. Assume that there are 5 different nodes in the original network. Then the system may be restricted such that the M-bit field in each Hi can take only 5 possible values, each corresponding to a valid address. Clearly, in this case the header cannot carry M information bits. An option for encoding the desired information would be to use permutation coding. For example, in an emergency mode the system can organize the PLEs in frames of length 5, and in each frame send one PLE to a different address, such that each frame can be arranged in 5!=120 different ways and the useful information is encoded in the way in which the PLEs are arranged in the frame.

Hence, one frame carries information of Log 2 120=6.9 bits, which implies approximately 1.4 bits per frame which is less than M bits (note that M needs to be at least 3 in order to be able to address 5 different nodes).

Figure 11:
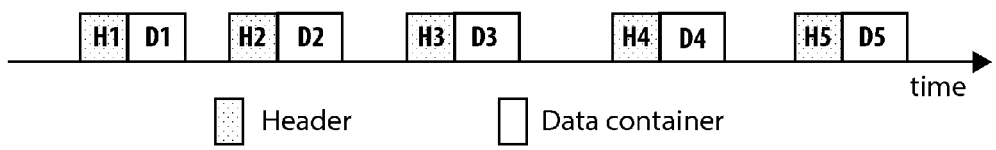
FIG. 11 is a schematic illustration of a robust communication channel (emergency mode) in which both header PLEs and data container PLEs are used to send the information.

The original communication system can put other restrictions in which the PLEs are sent. This can depend not only on the specification/standardization of the original communication system, but also on its implementation. Although in principle we can force the system to operate as on FIG. 7 and send two consecutive header PLEs, this could not be possible in practice. For example, the constraint may be to work with an existing chipset, where the manipulation of the PLEs can have various restrictions. Such one can be that each header PLE is followed by a PLE that is a data container. In that case the system cannot operate in an emergency mode as depicted on FIG. 10, but the low-rate robust channel should follow the transmission structure depicted on FIG. 11. One possibility is to keep dummy data in the data containers D1, D2, . . . D5, while the headers are encoded exactly the same as in the emergency mode described in relation to FIG. 10. Clearly, if dummy Di are used, then the system efficiency, expressed in terms of the average time required to convey the robustly encoded message, would be lower for the system on FIG. 11 compared to the system on FIG. 10. In order to make it more efficient, we can refer to the general transmission scheme depicted on FIG. 9: an error control code can be used and the output of this code can be mapped both to Hi and to Di, such that the data containers Di are not dummy, but they are also carrying information about the message that needs to be sent robustly. However, compared to the ordinary communication mode, now Hi is not simply a pointer towards the data carried in Di. One simple way of encoding would be the following: the original message is appended with LMLH, encoded with an error correction code. Part of the output bits of the error correction code is sent through the headers, while the other part is sent through the data containers. The receiver decodes all the received Hi and Di before deciding the content of the message header and the message itself.

In another variant, LMLH is separately encoded with an error correction code and the output bits of this code are only mapped to several consecutive frame headers. The message is encoded with another error correction code and the output bits of this error correction code are put in the data containers of the frames whose headers carry the LMLH.

In a certain legacy wireless system that features multiple communication nodes and/or two-way communication between nodes, all nodes may transit to operate in a robust manner and communicate with each other reliably by using the methods proposed in this invention.

Figure 12:
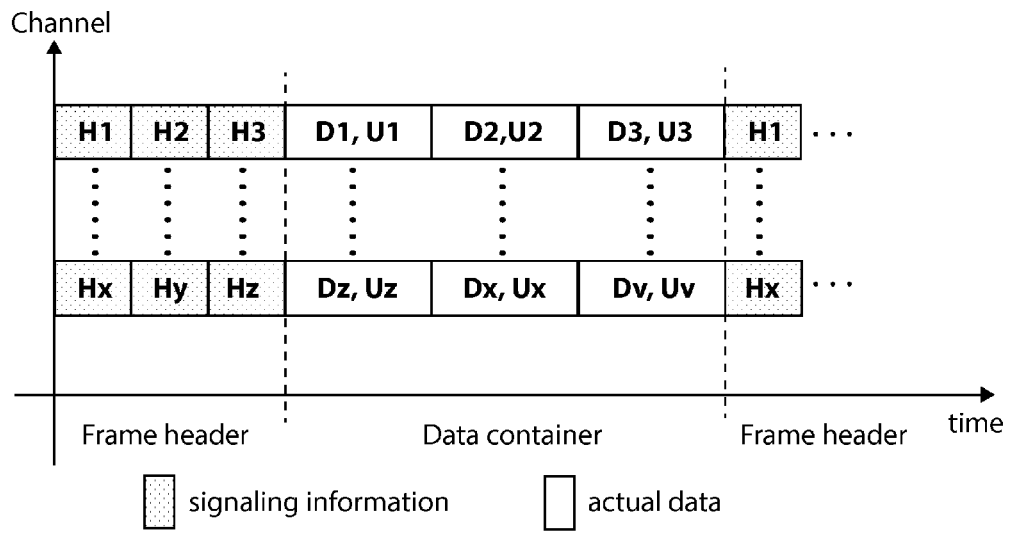
FIG. 12 is a schematic illustration of a frame-based multi-user wireless system, illustrating the usual operation, where the frame header carries only a signalling information and the frame headers of two different frames are unrelated.

In some wireless communication systems there is a strict timing structure, comprising of frames that start with a header structure and continue with a data part. Such are many of the contemporary multiuser broadband wireless communication systems—WiMax, LTE, satellite systems, etc. In those systems the frame header contains information about the content of the data containers in the data part, the type of modulation that will be used, the way the channels are allocated, etc. In the example on FIG. 12, the frame is defined in a time-frequency domain, i. e. each frame spans certain frequency band that contains multiple channels and several time slots. In order to create a low-rate robust channel, the message can be mapped on the headers and the data part by preserving their time structure, e. g. in a robust communication mode, the system does not need to be forced to send two frame headers consecutively. In this way the system preserves the backward compatibility with the legacy devices, which can continue to operate normally even when the system tries to send a message in a robust way. Similar to the discussion above, the legacy (primary) communication system can have restrictions. For example, if there are M bits in the frame header that can be changed (e. g. containing the addresses of the users or the content of the data that is following in the data container part), then the robust communication module might not be allowed to use all 2^M possible values for those bits. This could be the case if the M bits carry information about the addresses of the communication nodes that need to receive particular data from the data container part and, due to the decision in the legacy communication system, the address of a certain user must be present in the M bits.

Figure 13:
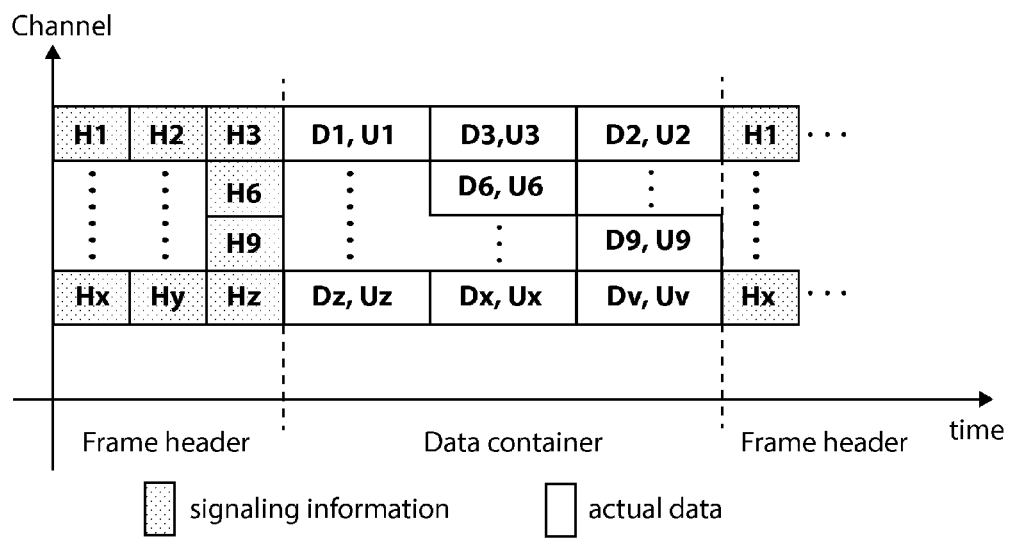
FIG. 13 is a schematic illustration of a robust embedded channel comprising fixed allocated headers/data containers (H3, H6, H9, D3, D6, D9 with robust encoding), this channel may coexist with the usual traffic in a normal operation mode.

FIG. 13 depicts a situation in which part of the frame header and part of the data container part, agreed in advance by the transmitter and the receiver (or multiple receivers) can be used as a container to send data reliably. Such a reliable data container spreads across multiple frames.

One of the most important operations is how the system of transmitters and receivers agrees to depart from the normal communication mode, where the headers are only used as descriptors of the data to be sent, to reliable (emergency) mode, where the information can be modulated by arbitrarily using the PLEs, headers and data containers. In simple words, when Bob receives header from Alice, it should know whether to interpret it as a self-standing signalling information, or it needs to decode it in conjunction with other PLEs of type H (as in the case of rateless headers) or it should treat the type-H PLE as an information/bearing signal.

One possibility is to use certain legacy communication system and redesign the communication protocol stack for all devices involved in mutual communication, such that all these nodes interpret the frame headers and data in a correct/consistent way.

In another scenarios, some devices in the network are capable of communicating through the robust wireless channel (let us call them rateless wireless devices), but the others are legacy devices that can only interpret the frame headers and data containers as prescribed in the legacy communication system. In this case the creation of robust channels towards the rateless wireless devices is still possible, but the communication should be made under a restriction not to induce undesirable/erroneous states at the legacy devices. For example, one way to do it is to use only values for the frame headers that a legacy device would interpret as "this information is not for me and the data container part will be ignored".

The transition to a reliable/emergency mode can be also made dynamically. Assume that the communication between Alice and Bob is done in such a way that Alice sends data and Bob sends feedback (ACK or NACK) whether the data has been received correctly. Since the primary application of this invention is to enable low-rate data transmission when Bob experiences non-typically high error rates, then whenever both Alice and Bob detect that such a situation has occurred, they should start to operate in a reliable mode. Let us assume that in normal communication mode the header of a packet, comprising M bits, only uses S different messages, where S<2^M. Then there is at least one possible value of the header that does not appear in a normal communication mode. Let us call this value EI (Emergency Initialization) header value. In practice, this is a "dummy" header in the original communication system. Here are some ways in which the EI value can be used.

If Alice receives K consecutive NACK packets from Bob, where K is a predefined number, then both Alice and Bob can enter in the emergency mode. In this case, after Bob sends K NACKs, it enters the emergency mode, assumes that Alice has also received K NACKs and waits for the next packet from Alice. Bob keeps sending NACK until it receives the EI value. If Bob receives a header with the EI value, then both Alice and Bob know that they have entered the reliable mode, where the headers and the data containers should note be interpreted only as in a normal communication mode.

Bob might send a dedicated short packet that explicitly informs Alice that Alice should switch to an emergency mode. Bob may persistently send this packet until receiving the EI packet.

If Alice does not receive any ACK/NACK packet from B during J consecutive rounds, then Alice starts to send the EI header persistently until receiving acknowledgement from Bob that Bob has received the EI packet. As an alternative criterion, Alice may send P consecutive EI packets and, if it does not receive ACK from Bob, then assume that Bob has also transited to a reliable/rateless mode, such that Alice can start to modulate the PLEs in a robust way.

However, it may happen that any header value can appear in a normal communication mode. In this case an option to initiate rateless/robust communication can be to break the structure of the original communication system. For example, instead of having a frame header followed by a data container, the device that wants to initiate reliable transmission of a message can send two or more frame headers consecutively. Practically, any transmission of PLEs that breaks the transmission structure of the legacy communication system can be used as a signal to initiate robust communication.

Another possibility is to keep the structure of the legacy communication system, but initiate robust transmission of a message through a sequence of header values sent by Alice. For example, while still in a normal communication mode, each individual header is interpreted as a signalling information; however, a particular sequence of headers can initiate the emergency mode. This is related to the concept of secondary communication where, in addition to the normal data, information is sent through the sequence of headers. However, here such a secondary channel is only used to initiate the transition towards reliable communication. Here are some examples how the information about switching to the emergency mode can be encoded by using headers that are otherwise valid for the normal communication mode:

Sequence of Addresses Used in the Packet Headers

In a packet-based communication system in which the data part can have variable length, the length is either reported in the packet header or a particular encoding method is used for the data part in order to mark the start/end of the packet. Regardless of that, a particular sequence of lengths can indicate that the communication should switch to an emergency mode.

Note that the reception of the header sequence can also be subject to errors. Therefore, the information can be encoded in the sequence of headers by using a certain error-correction code. For example, if the information is sent through a sequence of addresses, then a permutation code can be used in order to indicate the change from normal to emergency mode. If possible, after receiving the sequence of headers that indicates a change from normal to emergency, the receiving node Bob should send back to Alice data, header value or a sequence of headers, indicating that it has switched also to a reliable mode. After receiving such a sequence from Bob, Alice can start send data over the emergency channel.

If Alice and/or Bob conclude that it is not necessary to communicate in a reliable mode, they can switch back to a normal mode. This can happen, for example, by explicit signalling while the nodes are communicating in a reliable mode.

If there are more than two nodes A, B, C, D . . . involved in the communication, then using the described procedure they can all transit from normal to emergency mode.

The proposed method for rateless wireless communications can be applied in any system where there is practically a constant need for communication at least at a minimal rate. This involves applications such as: monitoring and control, safety-critical communication, alarms, remote programming, transmission of emergency messages.

One interesting instance is that rateless wireless communication enables the system to reconfigure and let the user send certain message when the normal communication mode fails to deliver the message. For example, in emergency scenarios, many users are trying to send Twitter or SMS messages as far as possible, to as many devices as possible. If the usual communication system fails to deliver the message, then the system can be configured to work in a reliable mode, using some of the techniques described above, and the whole protocol stack can be reconfigured in order to tunnel the application layer message (e. g. Twitter or SMS) to the link/MAC layer that will deliver it reliably.

The invention can be implemented by means of hardware, software, firmware or any combination of these. The invention or some of the features thereof can also be implemented as software running on one or more data processors and/or digital signal processors.

The individual elements of an embodiment of the invention may be physically, functionally and logically implemented in any suitable way such as in a single unit, in a plurality of units or as part of separate functional units. The invention may be implemented in a single unit, or be both physically and functionally distributed between different units and processors.

Although the present invention has been described in connection with the specified embodiments, it should not be construed as being in any way limited to the presented examples. The scope of the present invention is to be interpreted in the light of the accompanying claim set. In the context of the claims, the terms "comprising" or "comprises" do not exclude other possible elements or steps. Also, the mentioning of references such as "a" or "an" etc. should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous.

The present invention may be characterised by the following points:

1. A communication system comprising:
    two communication units configured for wireless communication, each of the two communication units comprising
    a communication controller configured to control communication to a wireless communication network, the communication controller including two communication protocols, a first protocol for communicating having a first error rate threshold and a fixed data rate, and a second protocol for communicating having a second error rate threshold being higher than the first error rate threshold and a non-fixed data rate, the communication controller being configured to switch from the first protocol for communicating to the second protocol for communicating.
2. The communication system according to point 1, wherein the first communication protocol includes transmitting a signalling unit and a corresponding data unit, the second communication protocol comprising transmitting data using the signalling unit of the first protocol.
3. The communication system according to point 2, wherein the second communication protocol further comprising transmitting data using the data unit of the first protocol.
4. The communication system according to any one of the points 1-3, wherein the data blocks of the first communication protocol is used as signalling units in the second communication protocol.
5. The communication system according to any one of the points 1-4, wherein the second protocol lowers data rates gradually towards zero for re-establishing a communications channel.
6. The communication system according to any one of the points 1-5, wherein the first protocol includes reducing transmission rate due to increasing error rate until a predetermined transmission rate limit.

7. The communication system according to any one of the points 1-6, wherein one communication unit broadcasts information to a plurality of communication units.

8. A method for communicating using a communication system comprising:
two communication units configured for wireless communication, each of the two communication units comprising:
a communication controller configured to control communication to a wireless communication network, the communication controller including two communication protocols, a first protocol for communicating having a first error rate threshold and a fixed data rate, and a second protocol for communicating having a second error rate threshold being higher than the first error rate threshold and a non-fixed data rate, the communication controller being configured to switch from the first protocol for communicating to the second protocol for communicating,
the method comprising:
determining first error rate when using the first protocol,
determining if first error rate is above a first predetermined threshold,
provided the first error rate is above the first predetermined threshold, switching the communication from the first communication protocol to the second communication protocol.

9. The method according to point 8, wherein the first protocol includes transmitting a signalling unit and a corresponding data unit, the second communication protocol comprising transmitting data using the signalling unit of the first protocol, the method comprising arranging data to be transmitted using the second protocol in the signalling units of the first protocol.

10. The method according to point 9, wherein the second communication protocol further comprising transmitting data using the data unit of the first protocol, the method comprising arranging data to be transmitted using the second protocol in the data units of the first protocol.

11. The method according to point any one of the points 8-10, wherein the data blocks of the first communication protocol is used as signalling units in the second communication protocol.

12. The method according to point any one of the points 8-11, wherein the second protocol lowers data rates gradually towards zero for re-establishing a communications channel.

13. The method according to point any one of the points 8-12, wherein a communication unit broadcasts to a plurality of communication units.

The invention claimed is:

1. A communication system comprising:
two communication units configured for wireless communication, each of the two communication units comprising
a communication controller configured to control communication to a wireless communication network, the communication controller configured to communicate using one of two communication protocol modes where a first communication protocol mode uses a first protocol for communicating having a first error rate threshold and a fixed data rate, and a second communication protocol mode uses a second protocol for communicating having a second error rate threshold being higher than the first error rate threshold and a non-fixed data rate,
the communication controller being configured to reconfigure the first protocol for communicating to the second protocol for communicating,
wherein the first communication protocol includes transmitting a signalling unit and a corresponding data unit, the second communication protocol treating the signalling units and the data units of the first communication protocol as secondary modulation symbols and the data unit and the signalling unit for the second communication protocol are sent through the secondary modulation symbols,
the second communication protocol comprising transmitting data using the signalling unit or the data unit of the first protocol.

2. The communication system according to claim 1, wherein the first communication protocol includes transmitting metadata using signalling units and data using data units.

3. The communication system according to claim 1, wherein data blocks of the first communication protocol are used as signalling units in the second communication protocol.

4. The communication system according to claim 1, wherein the second protocol lowers data rates gradually towards zero for re-establishing a communications channel.

5. The communication system according to claim 1, wherein the first protocol includes reducing transmission rate due to increasing error rate until a predetermined transmission rate limit.

6. The communication system according to claim 1, wherein one communication unit broadcasts information to a plurality of communication units.

7. A method for communicating, using a communication system having:
two communication units configured for wireless communication, each of the two communication units including:
a communication controller configured to control communication to a wireless communication network, the communication controller configured for communicate using one of two communication protocol modes, in first communication protocol mode uses a first protocol for communicating having a first error rate threshold and a fixed data rate, and a second communication protocol mode a second protocol for communicating having a second error rate threshold being higher than the first error rate threshold and a non-fixed data rate,
the communication controller being configured to reconfigure the first protocol for communicating to the second protocol for communicating, and
wherein the first communication protocol includes transmitting a signalling unit and a corresponding data unit, the second communication protocol treating the signalling units and the data units of the first communication protocol as secondary modulation symbols and the data unit and the signalling unit for the second communication protocol are sent through the secondary modulation symbols,
the method comprising the steps of:
determining first error rate when using the first protocol,
determining if first error rate is above a first predetermined threshold, and
provided the first error rate is above the first predetermined threshold, switching the communication from the first communication protocol to the second communication protocol, wherein the first protocol includes transmitting metadata using signalling units and data using data units, the second communication protocol comprising transmitting data using the signalling unit of the first protocol, the method further comprising arranging data to be transmitted using the second protocol in the signalling units of the first protocol.

8. The method according to claim 7, wherein the second communication protocol further comprising transmitting data using the data unit of the first protocol, the method comprising arranging data to be transmitted using the second protocol in the data units of the first protocol.

9. The method according to claim 7, wherein data blocks of the first communication protocol are used as signalling units in the second communication protocol.

10. The method according to claim 7, wherein the second protocol lowers data rates gradually towards zero for re-establishing a communications channel.

11. The method according to claim 7, wherein a communication unit broadcasts to a plurality of communication units.

12. A communication system comprising:
two communication units configured for wireless communication, each of the two communication units comprising
a communication controller configured to control communication to a wireless communication network, the communication controller configured to communicate using one of two communication protocol modes where a first communication protocol mode uses a first protocol for communicating having a first error rate threshold and a fixed data rate, and a second communication protocol mode uses a second protocol for communicating having a second error rate threshold being higher than the first error rate threshold and a non-fixed data rate,
the communication controller being configured to reconfigure the first protocol for communicating to the second protocol for communicating,
wherein the first communication protocol includes transmitting a signalling unit and a corresponding data unit, the second communication protocol treating the signalling units and the data units of the first communication protocol as secondary modulation symbols and the data unit and the signalling unit for the second communication protocol are sent through the secondary modulation symbols, and
wherein the second protocol lowers data rates gradually towards zero for re-establishing a communications channel.

\* \* \* \* \*